(12) United States Patent
Takayama et al.

(10) Patent No.: US 7,930,817 B2
(45) Date of Patent: Apr. 26, 2011

(54) METHOD OF MANUFACTURING A THERMALLY ASSISTED MAGNETIC HEAD

(75) Inventors: Seiichi Takayama, Tokyo (JP); Koji Shimazawa, Tokyo (JP); Yasuhiro Ito, Tokyo (JP)

(73) Assignee: TDK Corporation, Tokyo (JP)

( * ) Notice: Subject to any disclaimer, the term of this patent is extended or adjusted under 35 U.S.C. 154(b) by 339 days.

(21) Appl. No.: 12/199,526

(22) Filed: Aug. 27, 2008

(65) Prior Publication Data

US 2009/0165285 A1 Jul. 2, 2009

(30) Foreign Application Priority Data

Dec. 28, 2007 (JP) ................................. 2007-340678

(51) Int. Cl.
*G11B 5/127* (2006.01)
*H04R 31/00* (2006.01)

(52) U.S. Cl. ............... 29/603.09; 29/603.07; 29/603.13; 29/603.15; 29/603.16; 29/603.18; 216/22; 216/37; 216/41; 216/48; 216/65; 360/121; 360/317

(58) Field of Classification Search ............... 29/603.09, 29/603.11, 603.13–603.16, 603.18; 216/22, 216/39, 41, 48, 65; 360/212, 317
See application file for complete search history.

(56) References Cited

U.S. PATENT DOCUMENTS

2008/0055762 A1* 3/2008 Shimazawa et al. ............ 360/59

FOREIGN PATENT DOCUMENTS

JP A-2006-185548 7/2006

* cited by examiner

*Primary Examiner* — Paul D Kim
(74) *Attorney, Agent, or Firm* — Oliff & Berridge, PLC

(57) ABSTRACT

A method comprises an opposing step of arranging a light-shielding film 50 having a recessed surface 52 and a pinhole 54 formed within the recessed surface 52 such that an end face 54X of the pinhole 54 of the light-shielding film 50 on the recessed surface 52 side and a light exit surface 4B oppose each other, while the shortest distance A52 between the light-shielding film 50 and a medium-opposing surface S in a thickness direction of the light-shielding film 50 is shorter than the shortest distance A54 between the end face 54X of the pinhole 54 on the side opposite from a transparent substrate 58 and the light exit surface 4B; a light-emitting step of causing a light-emitting device 3 to emit emission light 3A; and a detecting step of detecting the light transmitted through the pinhole 54 after being emitted from the light exit surface 4B.

4 Claims, 10 Drawing Sheets

METHOD OF MANUFACTURING A THERMALLY ASSISTED MAGNETIC HEAD

BACKGROUND OF THE INVENTION

1. Field of the Invention

The present invention relates to a method of manufacturing a thermally assisted magnetic head and an aperture apparatus used in the method.

2. Related Background Art

As hard disk drives have been increasing their recording density, thin-film magnetic heads have been required to further improve their performances. As the thin-film magnetic heads, those of composite type having a structure in which a magnetic detecting device such as magnetoresistive (MR) device and a magnetic recording device such as electromagnetic coil device are laminated have been in wide use, while these devices read/write data signals from/onto magnetic disks which are magnetic recording media.

In general, a magnetic recording medium is a sort of discontinuous body in which magnetic fine particles are assembled, while each magnetic fine particle has a single-domain structure. Here, one recording bit is constituted by a plurality of magnetic fine particles. Therefore, for enhancing the recording density, it is necessary to make the magnetic fine particles smaller, so as to reduce irregularities at boundaries of recording bits. When the magnetic fine particles are made smaller, however, their volume decreases, so that the thermal stability in magnetization may deteriorate, thereby causing a problem.

An index of the thermal stability in magnetization is given by $K_U V/k_B T$. Here, $K_U$ is the magnetic anisotropy energy of the magnetic fine particle, V is the volume of one magnetic fine particle, $k_B$ is the Boltzmann constant, and T is the absolute temperature. Making the magnetic fine particles smaller just reduces V, thereby lowering $K_U V/k_B T$ by itself, which worsens the thermal stability. Though $K_U$ may be made greater at the same time as measures against this problem, the increase in $K_U$ enhances the coercivity of the recording medium. On the other hand, the writing magnetic field intensity caused by a magnetic head is substantially determined by the saturated magnetic flux density of a soft magnetic material constituting a magnetic pole within the head. Therefore, no writing can be made if the coercivity exceeds a permissible value determined by the limit of writing magnetic field intensity.

Proposed as a method for solving such a problem in thermal stability of magnetization is a so-called thermally assisted magnetic recording scheme which applies heat to a magnetic recording medium immediately before applying a writing magnetic field, while using a magnetic material having a large value of $K_U$, so as to effect writing with lowered coercivity.

In such a thermally assisted magnetic head, a recording area of the recording medium is required to be locally irradiated with light emitted from a light-emitting device. As a method realizing this, a thermally assisted magnetic head equipped with an optical waveguide having a light exit surface on the medium-opposing surface has been known (see, for example, Patent Document 1 (Japanese Patent Application Laid-Open No. 2006-185548)). In the thermally assisted magnetic head equipped with such an optical waveguide, when light emitted from the light-emitting device is guided to the light entrance surface of the optical waveguide, the light is emitted from the light exit surface on the medium-opposing surface, whereby the recording area of the recording medium can locally be irradiated with the light.

SUMMARY OF THE INVENTION

For realizing appropriate thermally assisted magnetic recording, it is necessary to measure the intensity of light emitted from the optical waveguide at the time of manufacturing the thermally assisted magnetic head equipped with the optical waveguide. This is because the intensity of light emitted from the light exit surface of the optical waveguide is one of important parameters for determining the heating temperature in the recording area of the recording medium.

As a method of measuring the intensity of light emitted from the light exit surface of the optical waveguide, one measuring with a photodetector having a sufficiently large light-receiving surface opposed to the light exit surface and one converging the light emitted from the light exit surface with a condenser lens and then making it incident on the photodetector for measurement may be considered. While part of the light incident on the light entrance surface of the optical waveguide leaks from the core of the optical waveguide so as to be emitted from the cladding of the optical waveguide, the above-mentioned methods measure the light emitted from the cladding as well. Only the light emitted from the core of the optical waveguide can contribute to heating the recording medium in the thermally assisted magnetic recording. Therefore, a step of measuring only the light emitted from the core of the optical waveguide is important in the method of manufacturing the thermally assisted magnetic head equipped with the optical waveguide.

As a method of measuring only the light emitted from the core of the optical waveguide, one providing a light-shielding film formed with a pinhole opposed to the light exit surface of the optical waveguide may be considered. When the size of the pinhole is on a par with that of the core of the optical waveguide on the light exit surface, the light emitted from the cladding of the optical waveguide can be blocked by the light-shielding film, so that only the light emitted from the core can be taken out and measured.

When the light intensity measuring method using the light-shielding film formed with the pinhole is employed, however, the medium-opposing surface of the thermally assisted magnetic head may be damaged or smudged. In the above-mentioned light intensity measuring method, for taking out only the light emitted from the core of the optical waveguide, it is necessary for the light-shielding film formed with the pinhole and the medium-opposing surface to oppose each other. This causes a possibility of the light-shielding film and the medium-opposing surface coming into contact with each other during light intensity measurement, whereby the medium-opposing surface may be damaged or smudged. The medium-opposing surface is precisely processed into such a form that the head levitates by an appropriate flying height above the recording material at the time of recording and reproducing. Therefore, when the medium-opposing surface is damaged or smudged, the thermally assisted magnetic head may fail to levitate appropriately during operations of a hard disk drive, thereby causing troubles such as writing or reading errors and collisions between the magnetic head and recording medium.

In view of such a problem, it is an object of the present invention to provide a method of manufacturing a thermally assisted magnetic head equipped with an optical waveguide, which sufficiently suppresses the possibility of the medium-opposing surface being damaged or smudged to such an extent as to cause malfunctions at the time of recording and reproducing, and an aperture apparatus used in such a method.

For overcoming the above-mentioned problem, in one aspect, the present invention provides a method of manufacturing a thermally assisted magnetic head having a medium-opposing surface, a core of an optical waveguide including a light exit surface formed on the medium-opposing surface, and a light-emitting device provided such that light emitted therefrom reaches a light entrance surface of the core of the optical waveguide, the method comprising an opposing step of arranging a light-shielding film having a recessed surface and a pinhole formed within the recessed surface such that an end face on the recessed surface side of the pinhole of the light-shielding film and the light exit surface oppose each other, while the shortest distance between the light-shielding film and the medium-opposing surface in a thickness direction of the light-shielding film is shorter than the shortest distance between the end face of the pinhole on the side opposite from a transparent substrate and the light exit surface; a light-emitting step of causing the light-emitting device to emit light; and a detecting step of detecting the light transmitted through the pinhole after being emitted from the light exit surface.

The method of manufacturing a thermally assisted magnetic head in accordance with this aspect of the present invention can manufacture a thermally assisted magnetic head, while sufficiently lowering the possibility of the medium-opposing surface being damaged or smudged to such an extent as to cause malfunctions at the time of recording and reproducing The light emitted from the light-emitting device is incident on the light entrance surface of the core of the optical waveguide. Of the light incident on the light entrance surface, the part emitted from the light exit surface of the core of the optical waveguide passes through the pinhole formed in the light-shielding film. Of the light incident on the light entrance surface, the part having leaked to the cladding of the optical waveguide is blocked by the light-shielding film. Therefore, when the intensity of the light transmitted through the pinhole of the light-shielding film is measured, only the light emitted from the light exit surface of the core of the optical waveguide can be measured.

Since the recessed surface side of the light-shielding film and the medium-opposing surface are opposed to each other in the opposing step such that the shortest distance between the light-shielding film and the medium-opposing surface in the thickness direction of the light-shielding film is shorter than the shortest distance between the end face of the pinhole on the recessed surface side and the light exit surface, damages and smudges to the medium-opposing surface will be less than those in the case using a flat light-shielding film even if the light-shielding film and the medium-opposing surface come into contact with each other. This sufficiently lowers the possibility of the medium-opposing surface being damaged or smudged to such an extent as to cause malfunctions at the time of recording and reproducing.

In another aspect, the present invention provides a method of manufacturing a thermally assisted magnetic head having a medium-opposing surface, a core of an optical waveguide including a light exit surface formed on the medium-opposing surface, and a light-emitting device provided such that light emitted therefrom reaches a light entrance surface of the core of the optical waveguide, the method comprising an opposing step of arranging a light-shielding film provided within a recess of a transparent substrate and formed with a pinhole such that an end face of the pinhole of the light-shielding film on the side opposite from the transparent substrate and the light exit surface oppose each other, while the shortest distance between the transparent substrate and the medium-opposing surface in a thickness direction of the light-shielding film is shorter than the shortest distance between the end face of the pinhole on the recess side and the light exit surface; a light-emitting step of causing the light-emitting device to emit light; and a detecting step of detecting the light transmitted through the pinhole after being emitted from the light exit surface.

The method of manufacturing a thermally assisted magnetic head in accordance with this aspect of the present invention can manufacture a thermally assisted magnetic head, while sufficiently lowering the possibility of the medium-opposing surface being damaged or smudged to such an extent as to cause malfunctions at the time of recording and reproducing. The light emitted from the light-emitting device is incident on the light entrance surface of the core of the optical waveguide. Of the light incident on the light entrance surface, the part emitted from the light exit surface of the core of the optical waveguide passes through the pinhole formed in the light-shielding film. Of the light incident on the light entrance surface, the part having leaked to the cladding of the optical waveguide is blocked by the light-shielding film. Therefore, if the intensity of the light transmitted through the pinhole of the light-shielding film and the transparent substrate is measured, only the light emitted from the light exit surface of the core of the optical waveguide can be measured.

Since the recess side of the transparent substrate and the medium-opposing surface are opposed to each other in the opposing step such that the shortest distance between the transparent substrate and the medium-opposing surface in the thickness direction of the light-shielding film is shorter than the shortest distance between the end face of the pinhole on the recess side and the light exit surface, damages and smudges to the medium-opposing surface will be less than those in the case using a flat light-shielding film even if the light-shielding film and the medium-opposing surface come into contact with each other. This sufficiently lowers the possibility of the medium-opposing surface being damaged or smudged to such an extent as to cause malfunctions at the time of recording and reproducing.

Preferably, the method further comprises an adjusting step of adjusting an intensity of the light emitted from the light exit surface according to a result of detection of the light in the detecting step. This yields a thermally assisted magnetic head which can emit light having an appropriate intensity from the light exit surface.

Preferably, the adjusting step adjusts the intensity of the light emitted from the light exit surface by changing a driving current value for the light-emitting device. As a consequence, the intensity of the light emitted from the light exit surface can be adjusted easily.

Preferably, the adjusting step adjusts the intensity of the light emitted from the light exit surface by changing a relative positional relationship between the light-emitting device and the core of the optical waveguide. As a consequence, the optical axis of the light-emitting device and the optical axis of the optical waveguide can align with each other. This yields a thermally assisted magnetic head which can emit light having an appropriate intensity from the light exit surface.

In still another aspect, the present invention provides an aperture apparatus comprising a transparent substrate and a light-shielding film provided on the transparent substrate, wherein the light-shielding film has a recessed surface on the side opposite from the transparent substrate and a pinhole formed in the recessed surface.

When used for manufacturing a thermally assisted magnetic head equipped with an optical waveguide, the aperture apparatus in accordance with this aspect of the present invention can sufficiently lower the possibility of the medium-opposing surface being damaged or smudged to such an extent as to cause malfunctions at the time of recording and reproducing. When the pinhole of the light-shielding film and the light exit surface of the core of the optical waveguide are opposed to each other such that the light-shielding film of the aperture apparatus and the medium-opposing surface oppose each other, of the light incident on the light entrance surface of the core of the optical waveguide, the part emitted from the light exit surface of the core of the optical waveguide passes through the pinhole formed in the light-shielding film. Of the light incident on the light entrance surface, the part having leaked to the cladding of the optical waveguide is blocked by the light-shielding film. Therefore, if the intensity of the light transmitted through the pinhole of the light-shielding film is measured, only the light emitted from the light exit surface of the core of the optical waveguide can be measured.

Since the light-shielding film of the aperture apparatus has a recessed surface, when the light-shielding film of the aperture apparatus and the medium-opposing surface are opposed to each other such that the shortest distance between the light-shielding film and the medium-opposing surface in the thickness direction of the light-shielding film is shorter than the shortest distance between the end face of the pinhole on the recessed surface side and the light exit surface, damages and smudges to the medium-opposing surface will be less than those in the case using a flat light-shielding film even if the light-shielding film and the medium-opposing surface come into contact with each other. This sufficiently lowers the possibility of the medium-opposing surface being damaged or smudged to such an extent as to cause malfunctions at the time of recording and reproducing.

In still another aspect, the present invention provides an aperture apparatus comprising a transparent substrate and a light-shielding film provided on the transparent substrate, wherein the light-shielding film is provided within a recess formed in the transparent substrate and has a pinhole.

When used for manufacturing a thermally assisted magnetic head equipped with an optical waveguide, the aperture apparatus in accordance with this aspect of the present invention can sufficiently lower the possibility of the medium-opposing surface being damaged or smudged to such an extent as to cause malfunctions at the time of recording and reproducing. When the pinhole of the light-shielding film and the light exit surface of the core of the optical waveguide are opposed to each other such that the light-shielding film of the aperture apparatus and the medium-opposing surface oppose each other, of the light incident on the light entrance surface of the core of the optical waveguide, the part emitted from the light exit surface of the core of the optical waveguide passes through the pinhole formed in the light-shielding film. Of the light incident on the light entrance surface, the part having leaked to the cladding of the optical waveguide is blocked by the light-shielding film. Therefore, if the intensity of the light transmitted through the pinhole of the light-shielding film is measured, only the light emitted from the light exit surface of the core of the optical waveguide can be measured.

Since the light-shielding film of the aperture apparatus is provided within the recess formed in the transparent substrate, when the light-shielding film of the aperture apparatus and the medium-opposing surface are opposed to each other such that the shortest distance between the transparent substrate and the medium-opposing surface in the thickness direction of the light-shielding film is shorter than the shortest distance between the end face of the pinhole on the side opposite from the transparent substrate and the light exit surface, damages and smudges to the medium-opposing surface will be less than those in the case using a flat light-shielding film even if the light-shielding film and the medium-opposing surface come into contact with each other. This sufficiently lowers the possibility of the medium-opposing surface being damaged or smudged to such an extent as to cause malfunctions at the time of recording and reproducing.

Thus, the present invention provides a method of manufacturing a thermally assisted magnetic head equipped with an optical waveguide, which sufficiently lowers the possibility of the medium-opposing surface being damaged or smudged to such an extent as to cause malfunctions at the time of recording and reproducing, and an aperture apparatus used in such a method.

DESCRIPTION OF THE PREFERRED EMBODIMENTS

Figure 1:
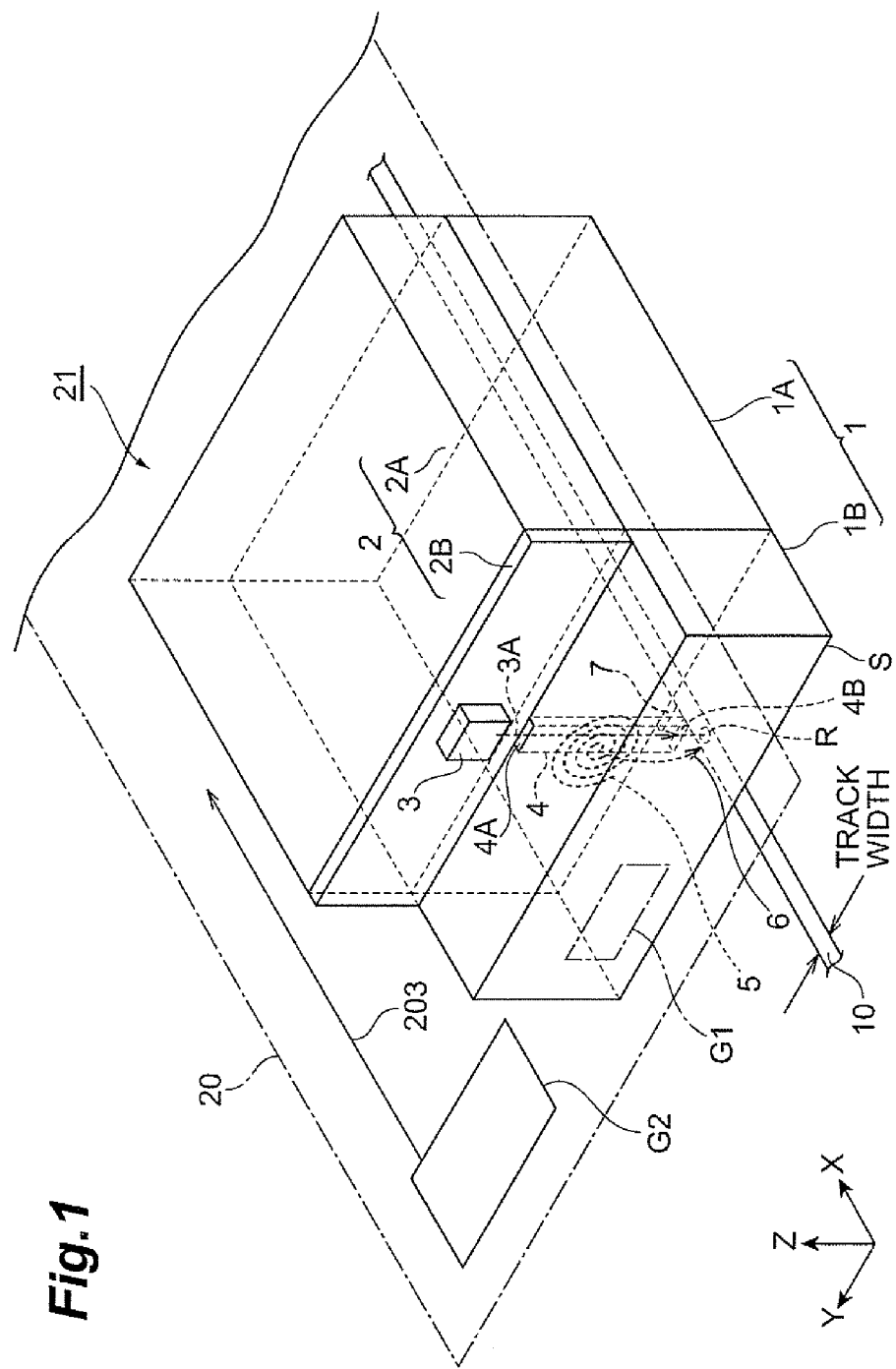
FIG. 1 is a perspective view of a magnetic head manufactured by the method of manufacturing a thermally assisted magnetic head in accordance with an embodiment.

In the following, the method of manufacturing a thermally assisted magnetic head in accordance with an embodiment and an aperture apparatus used in this method will be explained in detail with reference to the accompanying drawings. In the drawings, the same constituents will be referred to with the same numerals or letters while omitting their overlapping descriptions. For easier viewing of the drawings, ratios of dimensions within and between the constituents in the drawings are arbitrary.

FIG. 1 is a perspective view of a magnetic head manufactured by the method of manufacturing a thermally assisted magnetic head in accordance with the embodiment, illustrating a state where the magnetic head is attached to a suspension.

As shown in FIG. 1, a thermally assisted magnetic head 21 is attached to a leading end part of a suspension 20. The thermally assisted magnetic head 21 is constituted by a slider 1 and a light source unit 2 bonded to the slider 1. The slider 1 has a magnetic head part 1B formed on the YZ plane of the slider substrate 1A. The XY plane on the −Z side of the slider 1 forms a medium-opposing surface S. On the other hand, the light source unit 2 has an insulating layer 2B on the YZ plane of a light source supporting substrate 2A, while a light-emitting device 3 is secured onto the YZ plane of the insulating layer 2B.

The magnetic head part 1B comprises a plurality of devices embedded within an insulator. Specifically, the magnetic head part 1B is constituted by a spiral coil 5 which generates a magnetic field in response to a current supplied thereto, a main magnetic pole 6 extending from the center of the coil so as to guide a magnetic flux generated in the coil 5 to the medium-opposing surface S, a magnetoresistive device (MR device) 7 having a magnetosensitive surface exposed at the medium-opposing surface S, and a core 4 of an optical waveguide extending along the Z axis while using its surrounding insulator as a cladding.

The magnetic head part 1B is constituted by laminating the MR device 7, cladding, core 4, coil 5, and main magnetic pole 6 along the X axis. This laminating direction extends along a direction in which a recording area R within a track is arranged, while the track width is parallel to the Y axis.

The main magnetic pole 6 is not required to be exposed at the medium-opposing surface S as in this embodiment, but may be placed at any position as long as it can supply a magnetic field to the recording area R on the surface of the magnetic disk 10. An auxiliary magnetic pole may be provided near the main magnetic pole 6 if necessary, so that a magnetic line of force from the main magnetic pole 6 flows into the auxiliary magnetic pole through the recording area R.

The MR device 7, which is formed by laminating a fixed magnetization layer having a fixed magnetization direction and a free magnetization layer whose magnetization direction deflects according to a magnetic field thereabout, changes its magnetic resistance depending on the difference between the magnetization directions of the free and fixed magnetization layers. Namely, in response to the magnetic field occurring about the recording area R, the magnetic resistance of the MR device 7 changes, thereby altering a current flowing between a pair of electrode pads in an electrode pad group G1. Therefore, magnetic information recorded in the recording area R can be read as a change in the resistance value between a pair of electrode pads in the electrode pad group G1. Hard magnets for stabilizing magnetic domains of the free magnetization layer are arranged at both ends in the Y-axis direction of the free magnetization layer.

The core 4 of the optical waveguide has a light entrance surface 4A, on which light from the light-emitting device 3 is incident, on the XY plane on the positive side of the Z axis, and a light exit surface 4B on the XY plane on the negative side of the Z axis, i.e., on the medium-opposing surface S. In this embodiment, the light-emitting device 3 is an edge-emitting laser diode, so that laser light 3A (emission light 3A) emitted from an end face parallel to the XY plane enters the core 4 through the light exit surface 4A. The core 4 may have various forms, but linearly extends along the Z axis in this embodiment. In a cross section parallel to the XY plane, the core 4 may have lengths of 0.5 to 3 µm and 1 to 5 µm along the X and Y axes, respectively, for example.

The electrode pad group G1 constituted by a plurality of electrode pads is formed on the YZ plane on the negative side of the X axis in the magnetic head part 1B. The electrode pads are connected to both ends of the coil 5 and upper and lower electrodes of the MR device 7, respectively.

For effecting thermally assisted magnetic recording, the emission light 3A is initially emitted from the light-emitting device 3. Then, the emission light 3A enters the core 4 of the optical waveguide through the light entrance surface 4A and exits from the light exit surface 4B. The emission light 3A emitted from the light exit surface 4B locally heats the recording area R of the recording medium 10. The heated recording area R temporarily lowers its coercivity. During the period in which the recording area R lowers the coercivity, a current is caused to flow between another pair of electrode pads in the electrode pad group G1 so that the current flows between both ends of the coil 5, thereby applying a writing magnetic field from the main magnetic pole 6 to the recording area R. Thus, thermally assisted magnetic recording is performed on a recording medium 10 having a ferromagnetic material with a high thermal stability and a large coercivity as a recording layer.

A near-field-light-generating device (not depicted) may be formed on the light exit surface 4B. The near-field-light-generating device is a minute metal body which is exposed at the medium-opposing surface and has a leading end part. When the near-field-light-generating part is irradiated with the emission light 3A from the light-emitting device 3, electrons in the metal constituting the metal body are subjected to plasma oscillations, so that electric fields are converged at its leading end part. As a result, near-field light is generated from the near-field-light-generating device.

The electric field intensity of the near-field light is incomparably stronger than that of the emission light 3A, while this very strong near-field light rapidly heats the local recording area R of the recording medium 10. Since the near-field light has a span on a par with the radius of the leading end part of the metal body, making a sufficiently small radius in the leading end part yields a pseudo-effect of narrowing the emission light 3A to a diffraction limit or less. Because of these effects, the thermally assisted magnetic head 21 corresponding to a higher recording density can be obtained when the near-field-light-generating device is formed on the light exit surface 4B.

The slider substrate 1A and light source supporting substrate 2A are constituted by AlTiC ($Al_2O_3$—TiC), for example. The XY plane of the light source supporting substrate 2A on the positive side of the Z axis is bonded to the rear face of the suspension 20.

A method of manufacturing the thermally assisted magnetic head in accordance with this embodiment will now be explained.

First, using a known method, the thermally assisted magnetic head 21 having the above-mentioned medium-opposing surface S, the core 4 of the optical waveguide including the light exit surface 4B formed on the medium-opposing surface S, and the light-emitting device 3 provided such that the emission light 3A reaches the light entrance surface 4A of the core 4 of the optical waveguide is manufactured (see FIG. 1).

Subsequently, the light intensity with which the emission light 3A from the light-emitting device 3 is emitted from the light exit surface 4B of the core 4 of the optical waveguide is measured. This process will be explained with reference to FIGS. 2 and 3.

Figure 2:
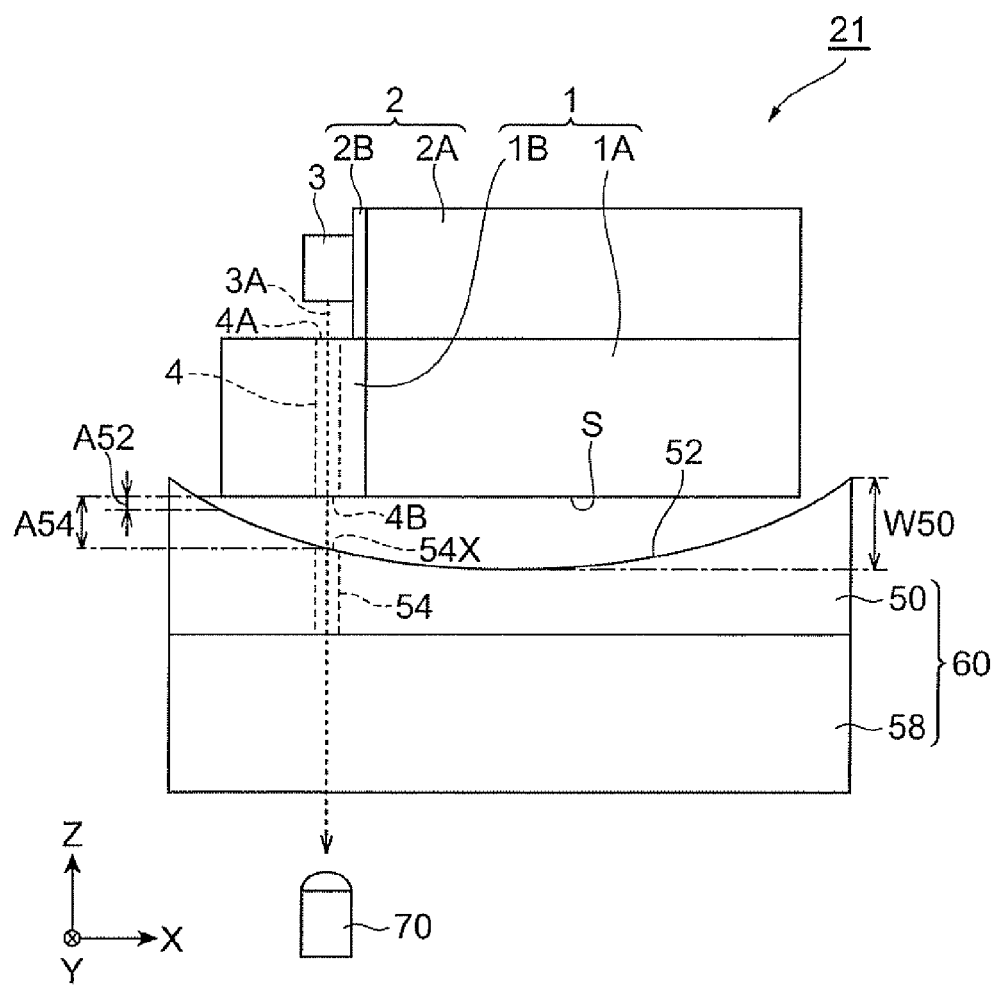
FIG. 2 is a schematic view showing a state where the thermally assisted magnetic head is opposed to the aperture apparatus in accordance with an embodiment.
Figure 3:
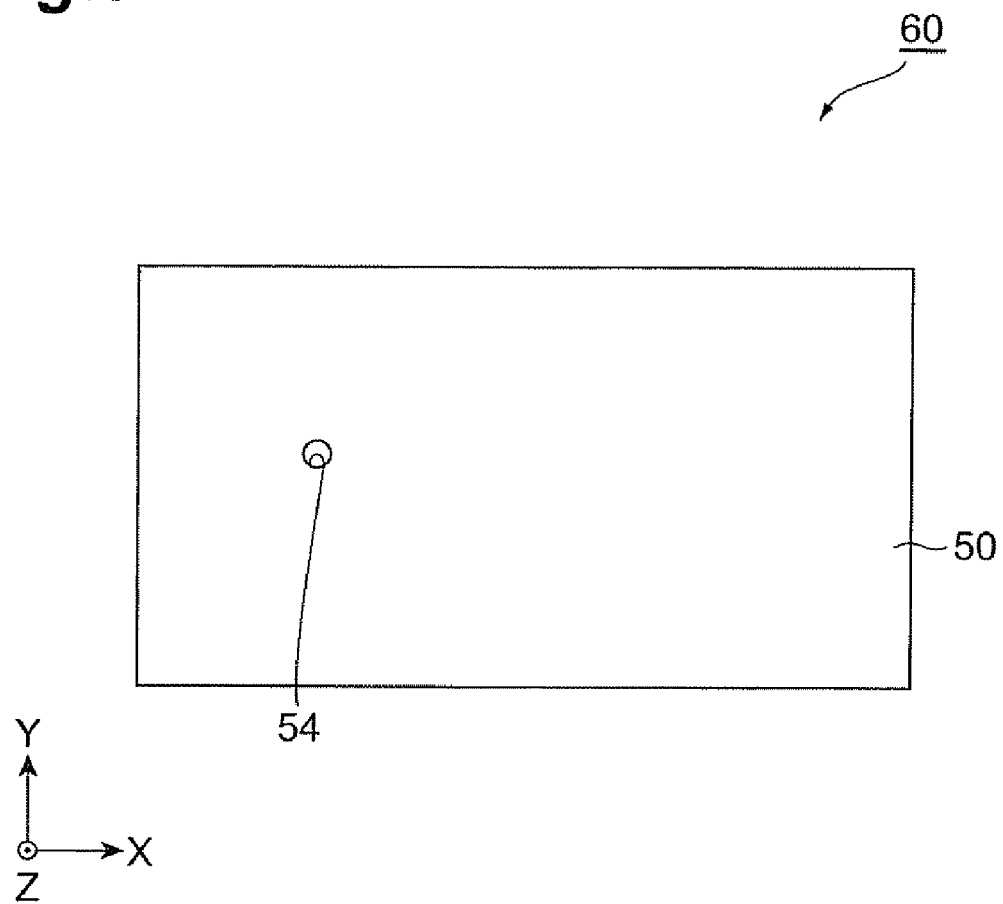
FIG. 3 is a plan view of the aperture apparatus in accordance with the embodiment.

FIG. 2 is a schematic view showing a state where the thermally assisted magnetic head is opposed to the aperture apparatus in accordance with this embodiment. FIG. 3 is a plan view of the aperture apparatus in accordance with the embodiment.

As shown in FIGS. 2 and 3, the aperture apparatus 60 in accordance with the embodiment comprises a transparent substrate 58 and a light-shielding film 50 provided on the transparent substrate 58. The light-shielding film 50 has a recessed surface 52 on the side opposite from the transparent substrate 58, while a pinhole 54 is formed in the recessed surface 52.

In this embodiment, the recessed surface 52 in the light-shielding film 50 has an arc-shaped cross section parallel to the XZ plane and a linear cross section on the YZ plane.

The light-shielding film 50 in the aperture apparatus 60 is formed from a metal such as Au, Al, Ta, or Cr, for example. The light-shielding film 50 may have a thickness of 50 to 200 nm, for example, at its thinnest part. By appropriately selecting the kind of a material forming it and its thickness, the light-shielding film 50 exhibits a sufficiently low transmittance with respect to the emission light 3A emitted by the light-emitting device 3. The light transmittance is preferably 1% or less at the thinnest part of the light-shielding film 50.

The pinhole 54 formed in the light-shielding film 50 may have a length of 50 to 200 nm, for example. Preferably, the cross-sectional area of the pinhole 54 parallel to the XY plane is at least 120% of the smallest area in the near-field form of the emission light 3A emitted from the light-emitting device 3 at the light exit surface 4B. This is because the light emitted from the light exit surface 4B can be measured thereby without exception as will be explained later. Preferably, the cross-sectional area of the pinhole 54 parallel to the XY plane is 150% or less of the smallest area in the near-field form of the emission light 3A emitted from the light-emitting device 3 at the light exit surface 4B. This is because, when measuring the light emitted from the light exit surface 4B, the light emitted from the cladding part for the core 4 of the optical waveguide can effectively be blocked as will be explained later. Specifically, the cross section of the pinhole 54 parallel to the XY plane may have a diameter of 1.2 to 7.5 µm, for example.

The recessed surface 52 may have an amount of warpage W50 (depth from the open end of the recessed surface 52 to the deepest part of the recessed surface) of 50 to 200 nm, for example.

The transparent substrate 58 is formed from a material having a high light transmittance such as glass, for example. The thickness of the substrate 58 may be 0.2 to 1.1 mm, for example, though not restricted in particular. Preferably, the transparent substrate 58 exhibits a light transmittance of 92% or greater with respect to the emission light 3A emitted by the light-emitting device 3.

For example, a method of manufacturing the aperture apparatus 60 forms a resist pattern at a position to form the pinhole 54 on the transparent substrate 58 such as glass substrate, and a material for forming the light-shielding film 50 is formed on the transparent substrate 58 by sputtering or the like. Thereafter, a part of the material forming the light-shielding film 50 is polished into a recessed surface, for example, so as to form the recessed surface 52. Thus, the aperture apparatus 60 can be manufactured. In this embodiment, the aperture apparatus 60 may be free of the transparent substrate 58.

Using such an aperture apparatus 60, an end face 54X on the recessed surface 52 side of the pinhole 54 of the light-shielding film 50 and the light exit surface 4B are opposed to each other as shown in FIG. 2. Here, the shortest distance A52 between the light-shielding film 50 and the medium-opposing surface S in the thickness direction of the light-shielding film 50 (i.e., direction along the Z axis) is made shorter than the shortest distance A54 between the end face 54X on the recessed surface 52 side of the pinhole 54 (the center of gravity of the open end face of the pinhole 54) and (the center of gravity of) the light exit surface 4B.

Subsequently, the light-emitting device 3 emits the emission light 3A. The emission light 3A emitted from the light-emitting device 3 is incident on the light entrance surface 4A of the core 4 of the optical waveguide. Of the light incident on the light entrance surface 4A, the part emitted from the light exit surface 4B of the core 4 of the optical waveguide passes through the pinhole 54 formed in the light-shielding film 50. Of the light incident on the light entrance surface 4A, the part having leaked to the cladding of the optical waveguide is blocked by the light-shielding film 50.

Next, the light transmitted through the pinhole 54 is detected by a photodetector 70 such as photodiode. Thus, the intensity of the light emitted from the light exit surface 4B of the core 4 of the optical waveguide can be measured. The measured light intensity at this time is a value not including the intensity of the light having leaked to the cladding of the optical waveguide.

The intensity of the light emitted from the light exit surface 4B of the core 4 of the optical waveguide is one of important parameters for determining the heating temperature in the recording area R (see FIG. 1) of the recording medium 10. It will therefore be preferred if the intensity of the light emitted from the light exit surface 4B of the core 4 of the optical waveguide is measured and then adjusted. This adjustment can be effected by changing the driving current value for the light-emitting device 3, for example. Such a method can very easily adjust the intensity of the light emitted from the light exit surface 4B.

Figure 4:
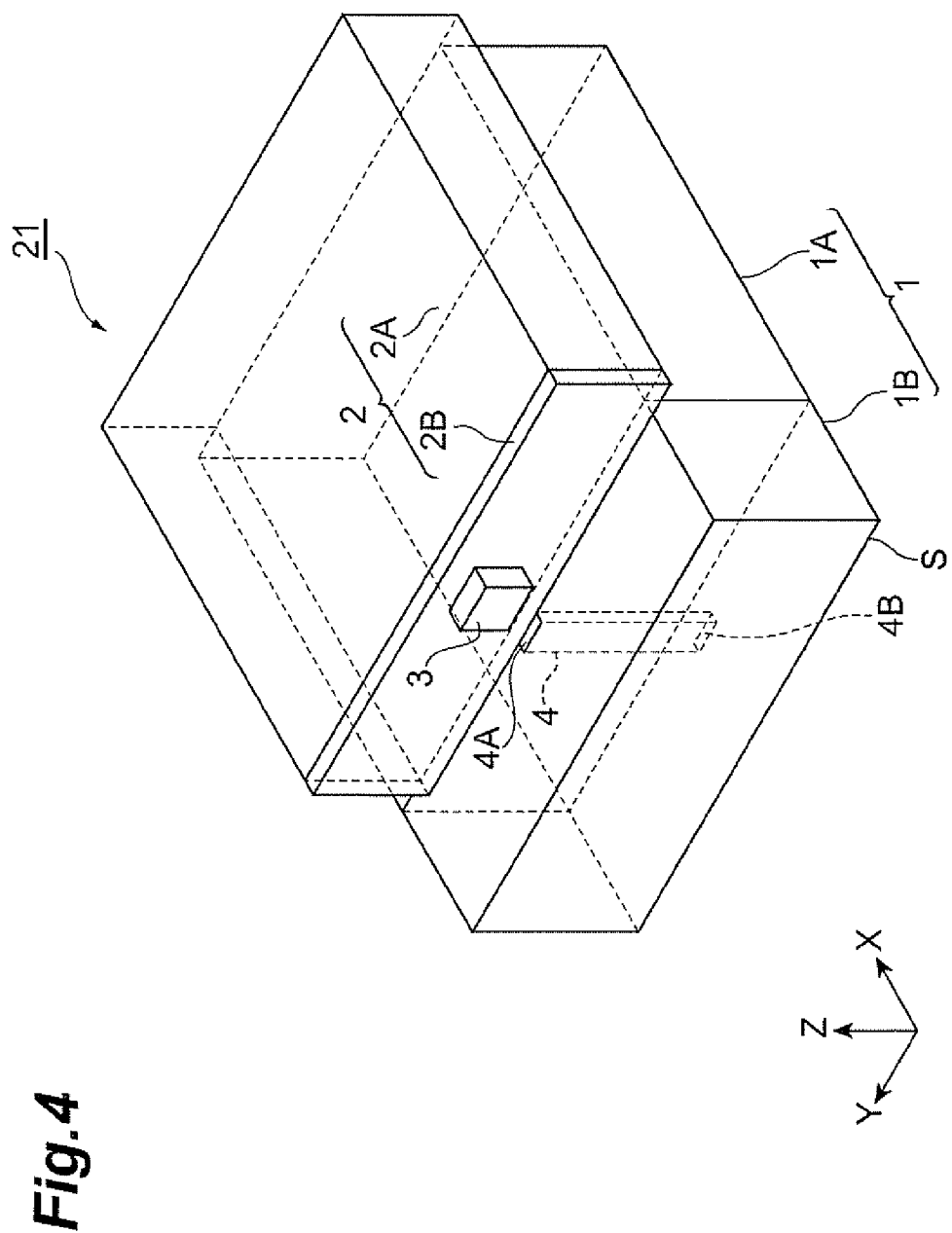
FIG. 4 is a perspective view of a magnetic head for explaining a method of changing a relative positional relationship between a light-emitting device and a core of an optical waveguide.

The intensity of the light emitted from the light exit surface 4B may also be adjusted by changing the relative positional relationship between the light-emitting device 3 and the core 4 of the optical waveguide. In this embodiment, as shown in FIG. 4, the relative positions of the slider 1 and light source unit 2 can be moved in directions along the XY plane, so as to change the relative positional relationship between the light-emitting device 3 and the core 4 of the optical waveguide. This can not only adjust the intensity of the light emitted from the light exit surface 4B, but also align the optical axis of the light-emitting device 3 and the optical axis of the core 4 of the optical waveguide with each other. In this case, the slider 1 and the light source unit 2 are bonded and secured to each other after aligning the optical axes with each other. The driving current value for the light-emitting device 3 can be changed together with the relative positional relationship between the light-emitting device 3 and the core 4 of the optical waveguide, so as to adjust the intensity of the light emitted from the light exit surface 4B. Thus, the thermally assisted magnetic head 21 is manufactured.

Since the above-mentioned aperture apparatus 60 is used for measuring the intensity of the light emitted from the light exit surface 4B of the core 4 of the optical waveguide, the method of manufacturing the thermally assisted magnetic head 21 in accordance with this embodiment can manufacture the thermally assisted magnetic head 21, while sufficiently lowering the possibility of the medium-opposing surface S being damaged or smudged to such an extent as to cause malfunctions at the time of recording and reproducing. Namely, when opposing the aperture apparatus 60 and the thermally assisted magnetic head 21 to each other in order to measure the intensity of the light emitted from the light exit surface 4B of the core 4 of the optical waveguide, the recessed surface 52 side of the light-shielding film 50 and the medium-opposing surface S are opposed to each other in this embodiment. Since the shortest distance A52 between the light-shielding film 50 and the medium-opposing surface S in the thickness direction of the light-shielding film 50 (direction along the Z axis) is made shorter than the shortest distance A54 between the end face 54X on the recessed surface 52 side of the pinhole 54 and the light exit surface 4B, damages and smudges to the medium-opposing surface S will be less than those in the case using a flat light-shielding film even if the light-shielding film 50 and the medium-opposing surface S come into contact with each other. This sufficiently lowers the possibility of the medium-opposing surface being damaged or smudged to such an extent as to cause malfunctions at the time of recording and reproducing.

When the medium-opposing surface S is damaged or smudged near the center thereof in particular, levitation characteristics of the thermally assisted magnetic head 21 are easy to be affected thereby. However, this embodiment lowers the possibility of the medium-opposing surface S being damaged or smudged near the center thereof even when the light-shielding film 50 and the medium-opposing surface S come into contact with each other. This lowers the possibility of the medium-opposing surface being damaged or smudged to such an extent as to cause malfunctions at the time of recording and reproducing in particular.

Without being restricted to the above-mentioned embodiment, the present invention can be modified in various manners.

Figure 5A:
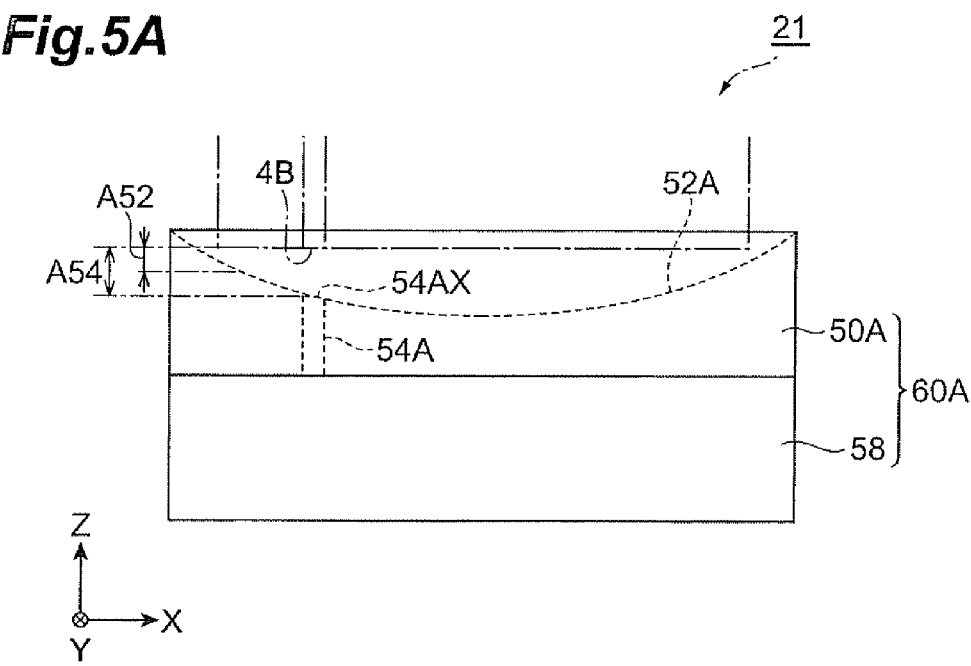
FIG. 5A is a schematic view showing a cross-sectional structure of a modified example of the aperture apparatus.
Figure 5B:
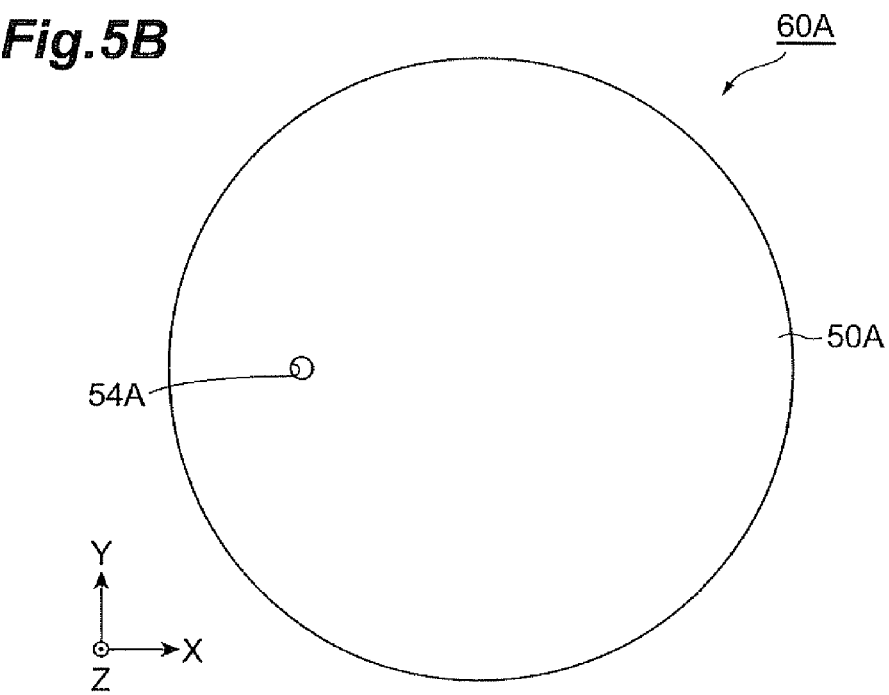
FIG. 5B is a plan view of the modified example of the aperture apparatus.
Figure 6:
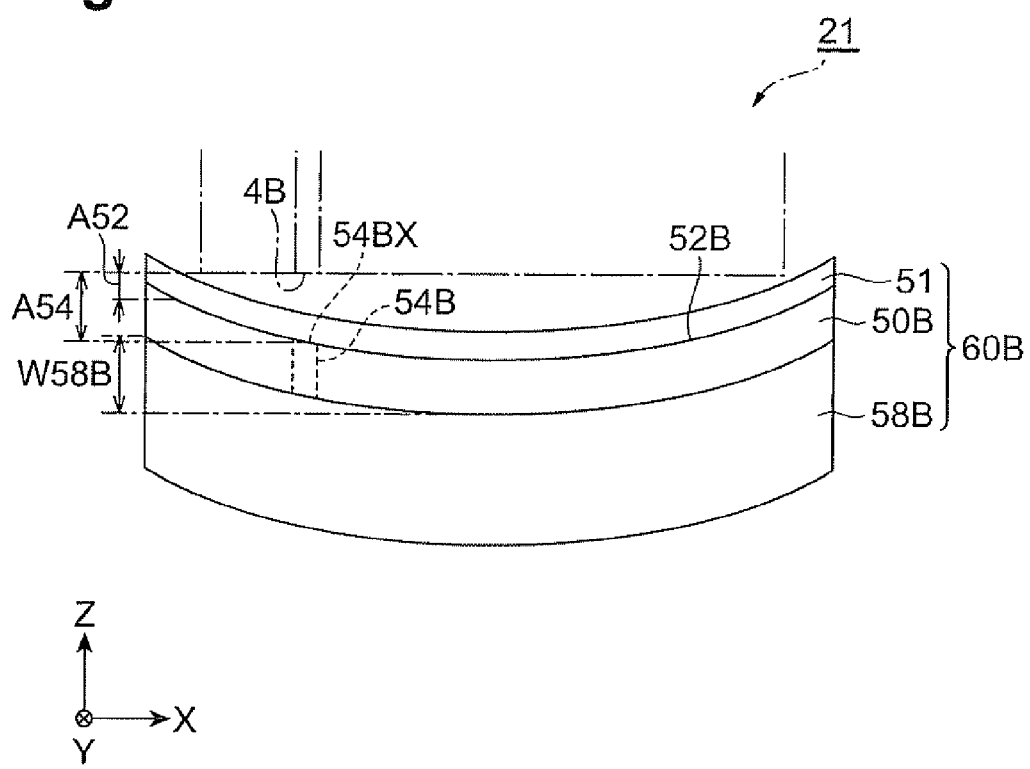
FIG. 6 is a schematic view showing a cross-sectional structure of a modified example of the aperture apparatus.
Figure 7:
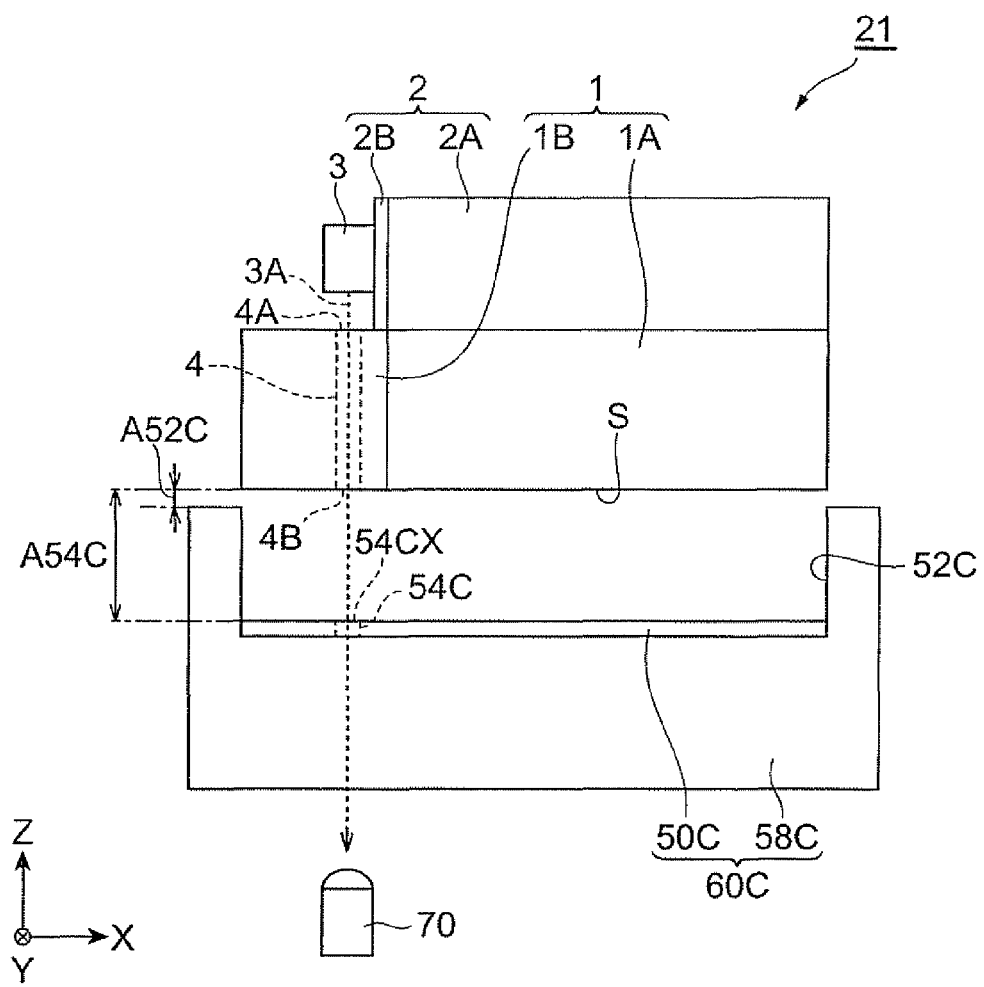
FIG. 7 is a schematic view showing a cross-sectional structure of a modified example of the aperture apparatus.

FIGS. 5 to 7 show modified examples of the aperture apparatus 60.

FIG. 5A is a schematic view showing a cross-sectional structure of an aperture apparatus 60A in accordance with a modified example, while FIG. 5B is a plan view of the aperture apparatus 60A. The aperture apparatus 60A differs from the aperture 60 (see FIG. 2) in the form of the light-shielding film. The light-shielding film 50A of the aperture apparatus 60A has a recessed surface 52A shaped like a concave lens. Namely, each cross-section of the recessed surface 52A parallel to the Z axis is shaped like an arc. When measuring the intensity with which the emission light 3A from the light-emitting device 3 (see FIG. 2) is emitted from the light exit surface 4B of the core 4 of the optical waveguide with thus constructed aperture apparatus 60A, an end face 54AX on the recessed surface 52A side of the pinhole 54A of the light-shielding film 50A and the light exit surface 4B are opposed to each other as in the case with the aperture apparatus 60. Here, the shortest distance A52 between the light-shielding film 50A and the medium-opposing surface S in the thickness direction of the light-shielding film 50A (i.e., direction along the Z axis) is made shorter than the shortest distance A54 between the end face 54AX on the recessed surface 52A side of the pinhole 54A and the light exit surface 4B. The rest is the same as that in the case with the aperture apparatus 60.

FIG. 6 is a schematic view showing a cross-sectional structure of a modified example of the aperture apparatus 60. In the aperture apparatus 60B in accordance with this modified example, a light-shielding film 50B having a recessed surface 52B and a pinhole 54B is formed on a transparent substrate 58B having a recessed surface, while a protective film 51 is formed on the light-shielding film 50B. The light-shielding film 50B is formed from a material similar to that of the light-shielding film 50 (see FIG. 2), while the protective film 51 is formed from a material exhibiting a high light transmittance such as $TiO_2$. The transparent substrate 58B and the light-shielding film 50B are bonded and secured to each other, while the light-shielding film 50B and the protective film 51 are bonded and secured to each other.

This aperture apparatus 60B is manufactured by deforming the whole aperture apparatus 60B with a stress inherent in the light-shielding film 50B and protective film 51, so as to provide the transparent substrate 58 with an amount of warpage W58B. For example, the coefficient of thermal expansion of the light-shielding film 50B and protective film 51 is greater than that of the transparent substrate 58B. The light-shielding film 50B and protective film 51 are formed at a higher temperature, and thus shrink more than the transparent substrate 58B after cooling. Hence, the transparent substrate 58 is provided with the amount of warpage W58B.

By appropriately selecting materials forming the light-shielding film 50B and protective film 51, their thickness and film-forming conditions, and the like, the recessed surface 52B can easily be formed in the aperture apparatus 60B. When measuring the intensity with which the emission light 3A from the light-emitting device 3 (see FIG. 2) is emitted from the light exit surface 4B of the core 4 of the optical waveguide with the aperture apparatus 60B, an end face 54BX on the recessed surface 52B side of the pinhole 54B of the light-shielding film 50B and the light exit surface 4B are opposed to each other as in the case with the aperture apparatus 60. Here, the shortest distance A52 between the light-shielding film 50B and the medium-opposing surface S in the thickness direction of the light-shielding film 50B (i.e., direction along the Z axis) is made shorter than the shortest distance A54 between the end face 54BX on the recessed surface 52B side of the pinhole 54B and the light exit surface 4B. The rest is the same as that in the case with the aperture apparatus 60. The aperture apparatus 60B may be free of the protective film 51.

FIG. 7 is a schematic view showing a cross-sectional structure of a modified example of the aperture apparatus 60. The aperture apparatus 60C in accordance with this modified example comprises a transparent substrate 58C and a light-shielding film 50C provided on the transparent substrate 58C, while the light-shielding film 50C is provided within a recess 52C formed in the transparent substrate 58C and has a pinhole 54C.

When measuring the intensity with which the emission light 3A from the light-emitting device 3 is emitted from the light exit surface 4B of the core 4 of the optical waveguide with the aperture apparatus 60C, an end face 54CX of the light-shielding film 50C, which is provided within the recess 52C of the transparent substrate 58C and formed with the pinhole 54C, on the side opposite from the transparent substrate 58C and the light exit surface 4B are opposed to each other. Here, the shortest distance A52C between the transparent substrate 58C and the medium-opposing surface S in the thickness direction of the light-shielding film 50C is made shorter than the shortest distance A54C between the end face 54CX of the pinhole 54C on the side opposite from the transparent substrate 58C and the light exit surface 4B. This can yield effects similar to those in the case using the aperture apparatus 60.

Figure 8:
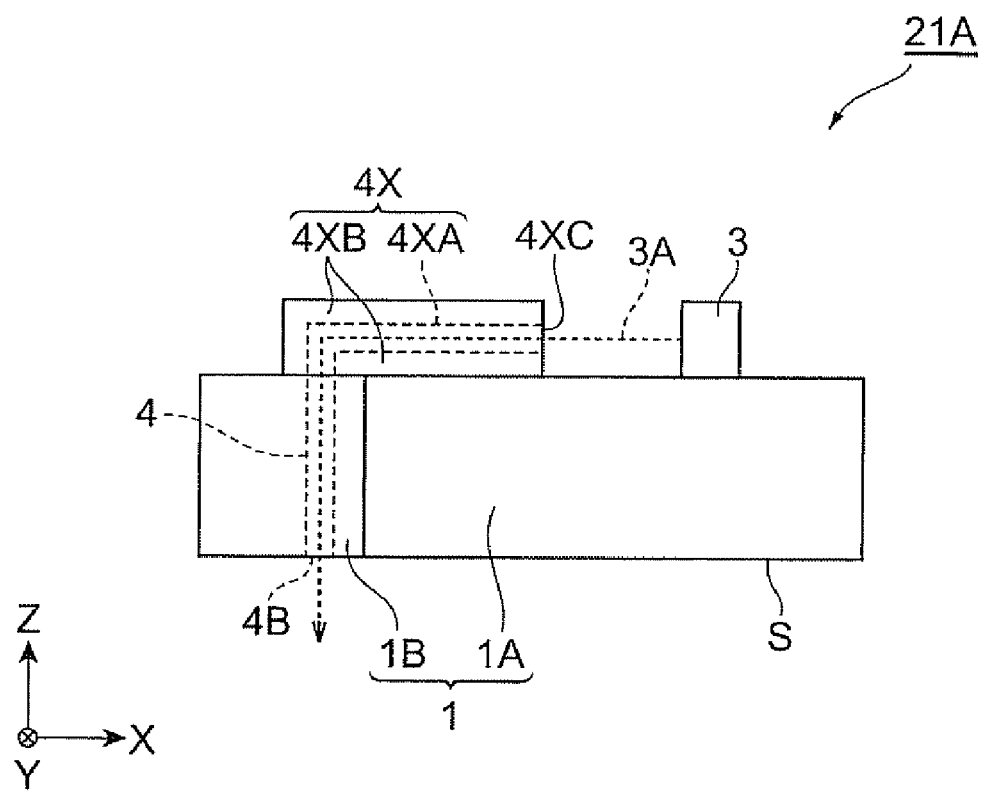
FIG. 8 is a schematic view of a cross section in a modified example of the thermally assisted magnetic head.
Figure 9:
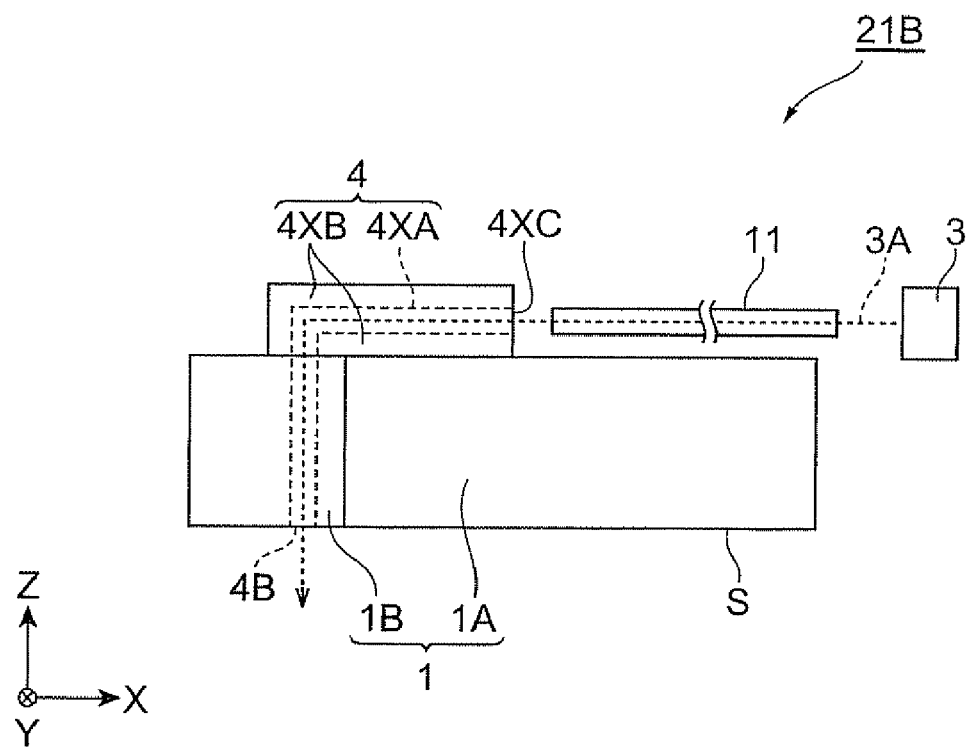
FIG. 9 is a schematic view of a cross section in a modified example of the thermally assisted magnetic head.
Figure 10:
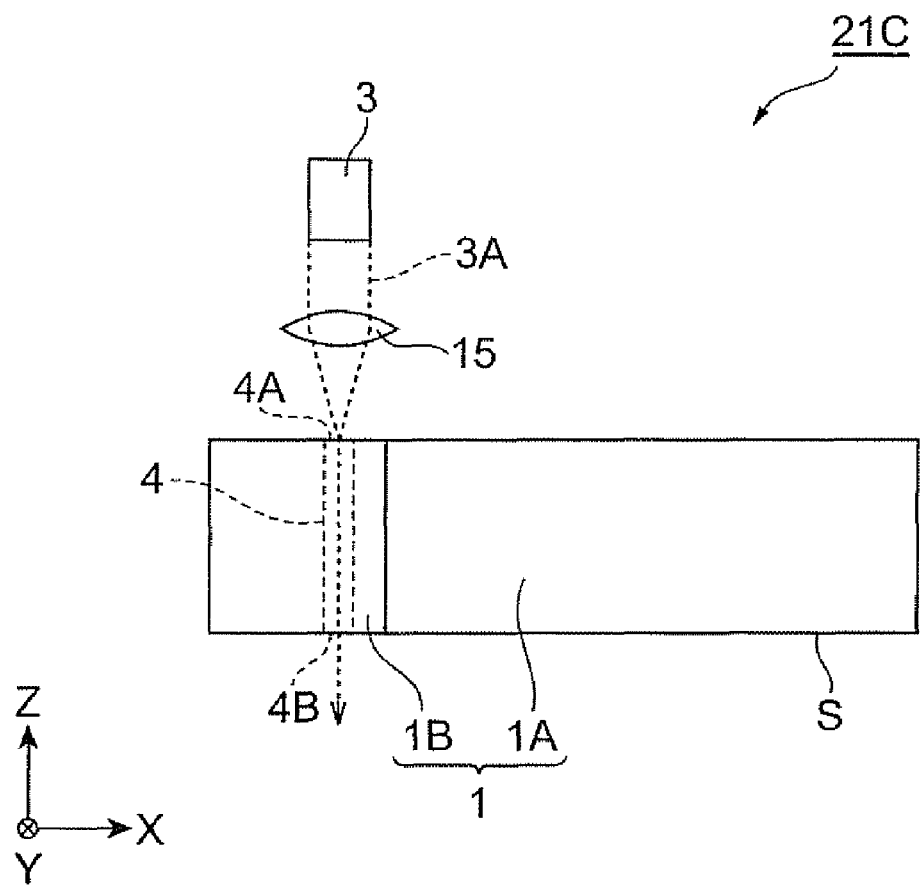
FIG. 10 is a schematic view of a cross section in a modified example of the thermally assisted magnetic head.

The thermally assisted magnetic head 21 (see FIGS. 1, 2, and 7) is not limited to the above-mentioned embodiment. FIGS. 8 to 10 are schematic views of cross sections in modified examples of the thermally assisted magnetic head.

The thermally assisted magnetic head 21A shown in FIG. 8 is provided with a core 4XA of an optical waveguide 4X connecting with the core 4 of the optical waveguide. The core 4XA extends in the –X direction from a light entrance surface 4XC and then bends in the –Z direction. A cladding 4XB is provided about the core 4XA. Therefore, the emission light 3A emitted from the light-emitting device 3 enters the core 4XA from the light entrance surface 4XC, advances in the –X direction, changes the advancing direction to the –Z direction, so as to advance through the core 4, and then is emitted from the light exit surface 4B. The rest is the same as that in the case with the aperture apparatus 60.

Thus, the core of the optical waveguide in the thermally assisted magnetic head is not required to extend linearly, but may bend at right angles as shown in FIG. 8 or at different angles. The core may be curved as well.

The thermally assisted magnetic head 21B shown in FIG. 9 differs from the thermally assisted magnetic head 21A shown in FIG. 8 in the position of the light-emitting device 3 and in that it is equipped with an optical fiber 11. In the thermally assisted magnetic head 21B, the light-emitting device 3 is not directly secured to the slider 1, but has a fixed relative position with respect to the slider 1. The optical fiber 11 is provided between the light-emitting device 3 and the light entrance surface 4XC of the core 4XA. Therefore, the emission light 3A emitted from the light-emitting device 3 advances through the optical fiber 11, so as to be made incident on the light entrance surface 4XC. Also, in the thermally assisted magnetic head 21 equipped with the linear core 4 as shown in FIG. 2, the light-emitting device 3 may be placed at a location distanced from the light entrance surface 4A, so that the light emitted from the light-emitting device 3 is guided to the light entrance surface 4A through an optical fiber.

The thermally assisted magnetic head 21C shown in FIG. 10 differs from the thermally assisted magnetic head 21 (see FIG. 2) in that the light-emitting device 3 is not secured to the slider 1 with the light source supporting substrate 2A. In the thermally assisted magnetic head 21C, a condenser lens 15 is provided between the light-emitting device 3 and light entrance surface 4A. The emission light 3A emitted from the light-emitting device 3 reaches the condenser lens 15, so as to be converged and enter the core 4 from the light entrance surface 4A.

The present invention can also be carried out when using these modified examples of the thermally assisted magnetic head 21A, 21B, and 21C (FIGS. 8, 9, and 10), whereby effects similar to those in the case with the thermally assisted magnetic head 21 (FIG. 2) can be obtained.

EXAMPLES

For further clarifying the effects of the present invention, Examples will now be explained.

First, a thermally assisted magnetic head equipped with a core of an optical waveguide shown in FIG. 2 was prepared. The slider in this thermally assisted magnetic head had lengths of 700 μm and 1225 μm along the Y and X axes, respectively. At the light exit surface of the core of the optical waveguide, the emission light emitted from the light-emitting device exhibited an elliptical near-field form of about 3 μm×about 4 μm.

Next, an aperture apparatus in accordance with Example 1 was made as shown in FIG. 6. As the transparent substrate, a white transparent glass sheet having a thickness of 0.5 mm was used. The size of the transparent substrate was made greater than that of the slider. Specifically, the transparent substrate had lengths of 800 μm and 1400 μm along the Y and X axes, respectively.

On this transparent substrate, a Ta layer having a thickness of 150 nm was formed as a light-shielding film by RF sputtering. The light transmittance of the light-shielding film in this case became 0.1% or less. A pinhole was formed in this light-shielding film. The diameter of the pinhole was 5 μm so as to be greater than the near-field form of the emission light at the light exit surface of the core of the optical waveguide. The light-shielding film formed by Ta generated a compressive stress, thereby applying an amount of warpage of 18 nm to the transparent substrate such that the light-shielding film side projected.

On this light-shielding film, a $TiO_2$ film having a thickness of 500 nm was formed as a protective film. The film stress of the protective film was 2000 MPa and applied an amount of warpage of 150 nm to the transparent substrate such that the light-shielding film side retracted. The warpage provided by the light-shielding film and the warpage provided by the protective film were superimposed on each other, whereby an amount of warpage of 132 nm was applied to the transparent substrate such that the light-shielding film side retracted. This formed the light-shielding film with a recessed surface.

Next, the intensity of the light emitted from the light exit surface of the core of the optical waveguide was measured. Specifically, the end face on the recessed surface side of the pinhole of the light-shielding film in the aperture apparatus in accordance with Example 1 was opposed to the light exit surface of the thermally assisted magnetic head. Since the aperture apparatus in accordance with Example 1 is made greater than the slider as mentioned above, even if the medium-opposing surface of the thermally assisted magnetic head and the aperture apparatus in accordance with Example 1 are brought into contact with each other, only the end part of the medium-opposing surface will come into contact with the aperture apparatus in accordance with Example 1, thereby further lowering the possibility of the center of the medium-opposing surface and thereabout coming into contact with the aperture apparatus in accordance with Example 1.

Then, the emission light was emitted from the light-emitting device, and the intensity of the light emitted from the light exit surface was monitored with a CCD camera. The monitoring may also be carried out with a power meter. Thereafter, the relative positional relationship between the light-emitting device and the core of the optical waveguide was changed (see FIG. 4), and fixed in the state where the intensity of the light emitted from the light exit surface was maximized. This allowed the optical axis of the light-emitting device and the optical axis of the core of the optical waveguide to align with each other.

Thereafter, the emission light was emitted from the light-emitting device, and the intensity of the light emitted from the light exit surface was measured by a photosensor having a large light-receiving area without the aperture apparatus and found to be 8 mW. The intensity of the emission light immediately after being emitted from the light-emitting device was 10 mW. Subsequently, the end face on the recessed surface side of the pinhole of the light-shielding film in the aperture apparatus in accordance with Example 1 and the light exit surface of the thermally assisted magnetic head were opposed to each other, and the intensity of the light transmitted through the pinhole was measured similarly and found to be 5 mW. This made clear that the intensity of the light transmitted through the core of the optical waveguide was 5 mW, so that the ratio of light utilized for heating the recording medium at the time of thermally assisted magnetic recording was 50%. It was also found that, when the intensity of the light emitted from the light exit surface was measured without the aperture apparatus in accordance with Example 1, not only the light emitted from the core of the optical waveguide but also the light emitted from the cladding part was measured, whereby the intensity of light utilized for heating the recording medium at the time of thermally assisted magnetic recording could not be measured accurately.

Next, smudges attached to the medium-opposing surface of the thermally assisted magnetic head after the light intensity measurement were evaluated. In this evaluation, an aperture apparatus in accordance with Example 2 was used in addition to the aperture apparatus in accordance with Example 1. The aperture apparatus in accordance with Example 2 was the same as the aperture apparatus in accordance with Example 1 except that the protective film formed from $TiO_2$ in the aperture apparatus in accordance with Example 1 was replaced by a protective film formed from SiO$_2$ having a thickness of 500 nm. At the thickness of 500 nm, SiO$_2$ had a film stress of 200 MPa, thereby applying an amount of warpage of 20 nm to the transparent substrate such that the light-shielding film side retracted. The warpage provided by the light-shielding film and the warpage provided by the protective film were superimposed on each other, whereby an amount of warpage of 2 nm was applied to the transparent substrate such that the light-shielding film side retracted. Consequently, the light-shielding film of the aperture apparatus in accordance with Example 2 was formed with a recessed surface smaller than that of the light-shielding film in the aperture apparatus in accordance with Example 1.

Next, using the aperture apparatus in accordance with Examples 1 and 2, the intensity of light emitted from the light exit surface was measured as mentioned above. Thereafter, the amount of smudges was evaluated on each of the medium-opposing surfaces of thermally assisted magnetic heads measured with the aperture apparatus in accordance with Examples 1 and 2, respectively. Specifically, the number of smudges (dust pieces) having a size of 5 nm or less within an area of 20 μm×20 μm arbitrarily selected from within the medium-opposing surface was counted by AFM. As a result, the numbers of smudges within this area were 1 and 33 in the thermally assisted magnetic heads using the aperture apparatus in accordance with Examples 1 and 2, respectively.

What is claimed is:

1. A method of manufacturing a thermally assisted magnetic head having a medium-opposing surface, a core of an optical waveguide including a light exit surface formed on the medium-opposing surface, and a light-emitting device provided such that light emitted therefrom reaches a light entrance surface of the core of the optical waveguide, the method comprising:

an opposing step of arranging a light-shielding film having a recessed surface and a pinhole formed within the recessed surface such that an end face on the recessed surface side of the pinhole of the light-shielding film and the light exit surface oppose each other, while the shortest distance between the light-shielding film and the medium-opposing surface in a thickness direction of the light-shielding film is shorter than the shortest distance between the end face on the recessed surface side of the pinhole and the light exit surface;

a light-emitting step of causing the light-emitting device to emit light; and a detecting step of detecting the light transmitted through the pinhole after being emitted from the light exit surface.

2. The method of manufacturing a thermally assisted magnetic head according to claim 1, further comprising an adjusting step of adjusting an intensity of the light emitted from the light exit surface according to a result of detection of the light in the detecting step.

3. The method of manufacturing a thermally assisted magnetic head according to claim 2, wherein the adjusting step adjusts the intensity of the light emitted from the light exit surface by changing a driving current value for the light-emitting device.

4. The method of manufacturing a thermally assisted magnetic head according to claim 2, wherein the adjusting step adjusts the intensity of the light emitted from the light exit surface by changing a relative positional relationship between the light-emitting device and the core of the optical waveguide.

* * * * *